US007859687B2

(12) United States Patent
Mitsutake

(10) Patent No.: US 7,859,687 B2
(45) Date of Patent: Dec. 28, 2010

(54) DETECTION APPARATUS AND TONER DETECTION APPARATUS USING THE SAME

(75) Inventor: Ikutarou Mitsutake, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/635,993

(22) Filed: Dec. 11, 2009

(65) Prior Publication Data

US 2010/0150584 A1 Jun. 17, 2010

(30) Foreign Application Priority Data

Dec. 16, 2008 (JP) .............................. 2008-319410

(51) Int. Cl.
*G01B 11/24* (2006.01)
*G01B 11/14* (2006.01)

(52) U.S. Cl. .................... 356/614; 356/601; 356/139.1; 250/235; 359/368

(58) Field of Classification Search ......... 356/600–625, 356/139.1, 139.03; 250/235; 359/234, 368
See application file for complete search history.

(56) References Cited

U.S. PATENT DOCUMENTS 5,424,538 A * 6/1995 Yoshino ...................... 250/235

| 6,587,148 | B1 * | 7/2003 | Takeda et al. ................ 348/342 |
| 6,631,029 | B2 * | 10/2003 | Kawamura et al. ........... 359/368 |
| 7,248,279 | B2 * | 7/2007 | Ishihara et al. ............... 347/244 |
| 7,417,722 | B2 * | 8/2008 | Bills et al. ................ 356/237.2 |
| 7,623,227 | B2 * | 11/2009 | Judell et al. ............... 356/237.2 |
| 2004/0189983 | A1 * | 9/2004 | Takahashi et al. ......... 356/139.1 |

FOREIGN PATENT DOCUMENTS

JP  2001-318302 A  11/2001

* cited by examiner

*Primary Examiner*—Sang Nguyen
(74) *Attorney, Agent, or Firm*—Rossi Kimms & McDowell LLP

(57) ABSTRACT

To provide a height detection apparatus capable of detecting height information of a subject surface even in a narrow area, the height detection apparatus includes: an illumination optical system for illuminating the subject surface with a light flux emitted from a light source unit; an imaging optical system for causing the light flux reflected on the subject surface to form an image as a line image on an imaging surface; and a light detection unit disposed on the imaging surface. A light detection surface of the light detection unit is positioned in a plane rotated about a rotational axis, the rotational axis being an axis which is perpendicular to an optical axis of an optical element positioned optically closest to the light detection unit among optical elements constituting the imaging optical system, and is perpendicular to the line image to be formed by the imaging optical system.

6 Claims, 4 Drawing Sheets

DETECTION APPARATUS AND TONER DETECTION APPARATUS USING THE SAME

BACKGROUND OF THE INVENTION

1. Field of the Invention

The present invention relates to a height detection apparatus for detecting height information (irregularity information) of a subject, which is measured from a reference surface (thickness information) by using an optical unit.

In particular, the present invention relates to a height detection apparatus used for an image forming apparatus employing an electrophotographic process, which is capable of detecting height information of toner attached on an image bearing member with high precision through application of observation principles of a confocal microscope.

2. Description of the Related Art

Conventionally, there has been known a height detection apparatus for detecting height information of a subject measured from a reference surface by using an optical unit. Such a height detection apparatus is widely used for an optical microscope (confocal microscope), a device for detecting a flaw on a sample surface, and the like.

As the height detection apparatus, there is known a device for detecting a position of a subject surface, that is, detecting height information of a sample surface by using a so-called confocal optical system or another optical system similar thereto (Japanese Patent Application Laid-Open No. 2001-318302).

In the height detection apparatus using the confocal optical system, light beams emitted from a light source unit are condensed on the sample surface, and the light beams reflected from the sample surface are caused to form an image again at a detection unit or in the vicinity thereof. Then, based on a variation in imaging state, information on a height position of the sample surface is detected.

FIG. 6 is a main part schematic diagram of a configuration of a height detection apparatus for detecting height information of a subject by using a confocal optical system.

In FIG. 6, light beams emitted from a light source unit 601 are converted into parallel light beams by a collimator lens 602. After that, the parallel light beams pass through a half mirror 603, and are then condensed on a subject surface 608 by a condensing lens 604.

The light beams reflected from the irradiated subject surface 608 pass through the condensing lens 604 again to be condensed. Then, the light beams are reflected by the half mirror 603. After that, the light beams are condensed at a pinhole slit 606 or in the vicinity thereof by an imaging lens 605.

The light flux that has passed through the pinhole slit 606 is detected for an optical intensity thereof by an optical detector 607 disposed downstream (in a passing direction) of the light flux. Based on the optical intensity detected by the optical detector 607, the height information of the subject surface 608 is detected.

The condensing lens 604 and the imaging lens 605 are disposed in a manner that, when the subject surface 608 is located at the focal position of the condensing lens 604, light reflected from the subject surface 608 forms an image at the pinhole slit 606, enabling the highest optical intensity to be detected at the optical detector 607.

Specifically, as the subject surface 608 becomes further displaced from the focal position of the condensing lens 604 in an optical axis direction thereof, the optical intensity to be detected by the optical detector 607 becomes smaller. Owing to this configuration, a height position of the subject surface 608 in the optical axis direction is detected.

In the height detection apparatus employing the confocal optical system, the height information of the subject surface 608 is detected using the configuration described above.

With the conventional height detection apparatus employing the confocal optical system, there occurs a case where surface height of the subject surface may not be detected accurately because the amount of reflected light detected by the optical detector varies due to variations in reflected light amount caused by the physical properties or roughness of the subject surface.

Further, with the method of only detecting how much intensity the light passing through the pinhole slit has, in principle, it may not be detected whether the subject surface is located in front of the focal point of the condensing lens or behind the focal point.

Further, when the position of the subject surface is displaced significantly from the focal point of the condensing lens, the intensity of the light passing through the pinhole slit decreases proportionately with the square of the displacement in height of the subject surface. As a result, detection precision for the position of the subject surface decreases extremely.

In a focus detecting device disclosed in Japanese Patent Application Laid-Open No. 2001-318302, light fluxes emitted from a linear light source (one-dimensional light source) having multiple point light sources arranged in one direction are condensed in line on a subject surface. Similarly, an imaging lens provided on an optical detector side causes the light reflected from the subject surface to form an image in line. Then, by using a one-dimensional optical sensor tilted by a minute angle with respect to an imaging surface about an axis perpendicular to the optical axis and the line image, the light reflected from the subject is detected.

However, with this method, when there are variations in height along the focal line of the subject surface, light beams reflected on the subject surface of multiple heights enter the optical detector. Accordingly, precise measurement is difficult to achieve with regard to the height information of the subject surface in a narrow area.

SUMMARY OF THE INVENTION

The present invention has an object to provide a height detection apparatus capable of detecting height information of a subject surface with high precision even in a narrow area.

In order to achieve the above-mentioned object, according to one aspect of the present invention, there is provided a detection apparatus including; a light source unit, an illumination optical system for illuminating a subject surface with a light flux emitted from the light source unit, an imaging optical system for causing the light flux reflected on the subject surface to form an image as a line image on an imaging surface, and a light detection unit disposed on the imaging surface, the light detection unit having multiple sensors arranged one-dimensionally or two-dimensionally, the detection apparatus detecting the height information of the subject surface in an optical axis direction of the illumination optical system based on light information detected by the light detection unit, in which; the light detection unit has a light detection surface thereof positioned on an optical axis of the imaging optical system, and the light detection surface of the light detection unit is positioned in a plane rotated about a rotational axis, the rotational axis being an axis which is perpendicular to an optical axis of an optical element positioned optically closest to the light detection unit among optical elements constituting the imaging optical system, and is perpendicular to the line image to be formed by the imaging optical system.

Further, in the above-mentioned detection apparatus, the light source unit may include a point light source, and the illumination optical system condenses the light flux emitted from the point light source on the subject surface in a dot shape.

Further, the imaging optical system may include an anamorphic optical surface, and the detection apparatus satisfies the following condition:

$$0.1 \leq \alpha/\sin\theta \leq 10$$

where $\alpha$ represents a longitudinal magnification of the imaging optical system in a plane containing the optical axis of the imaging optical system and the axis perpendicular to the line image, and $\theta$ represents a rotational angle of the light detection surface of the light detection unit with respect to the plane perpendicular to the optical axis of the imaging optical system.

Further, the illumination optical system and the imaging optical system may be arranged so that a principal ray of the light flux which is emitted from the illumination optical system and enters the subject surface enters the subject surface with a definite angle, and that the light flux which is reflected on the subject surface, passes through the imaging optical system, and forms the image on the light detection unit is formed of other light beams than specular reflection light beams from the subject surface.

Further, the line image to be formed by the imaging optical system may be formed in a plane in parallel with the subject surface.

Further, in order to achieve the above-mentioned object, a toner detection apparatus according to another aspect of the present invention may measure a height of toner attached on an image bearing member by employing the above-mentioned detection apparatus.

According to the present invention, the height detection apparatus capable of detecting the height information of the subject surface with high precision even in a narrow area may be provided.

Further features of the present invention will become apparent from the following description of exemplary embodiments with reference to the attached drawings.

DESCRIPTION OF THE EMBODIMENTS

Hereinbelow, exemplary embodiments of the present invention are described in detail with reference to the attached drawings.

A height detection apparatus according to the present invention uses an illumination optical system to illuminate, in a dot shape, a subject surface with a light flux emitted from a light source unit formed of a point light source.

By using the light reflected from the subject surface, an imaging optical system having an anamorphic refractive power forms an image of part of the subject surface as a line image (focal line).

At an imaging surface of the imaging optical system, a light detection unit having multiple sensors arranged one-dimensionally or two-dimensionally is disposed.

A light detection surface of the light detection unit is tilted by an angle $\theta$ with respect to a plane perpendicular to an optical axis of the imaging optical system.

Specifically, the light detection surface of the light detection unit is positioned on the optical axis of the imaging optical system, is perpendicular to an optical axis of an optical element which is positioned optically closest to the light detection unit among optical elements constituting the imaging optical system, and is positioned in a plane rotated about a rotational axis, the rotational axis being an axis which is perpendicular to the line image formed by the imaging optical system.

Then, based on light information detected by the light detection unit, height information of the subject surface in an optical axis direction of the illumination optical system is detected.

First Embodiment

Figure 1:
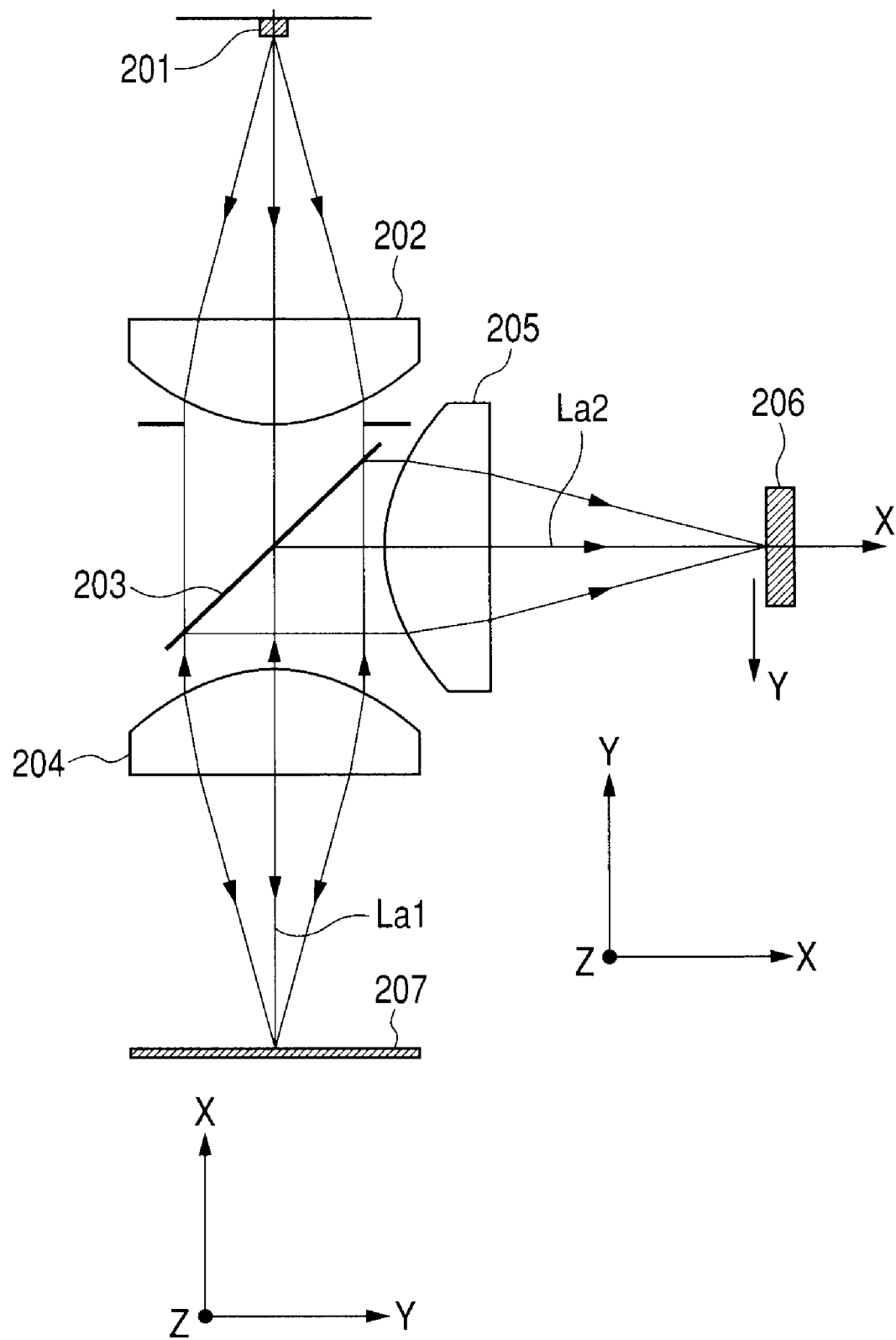
FIG. 1 is a main part schematic diagram of a height detection apparatus according to a first embodiment of the present invention.

FIG. 1 is a schematic configuration diagram of a height detection apparatus for detecting height information of, for example, toner as a subject according to a first embodiment of the present invention.

Figure 2:
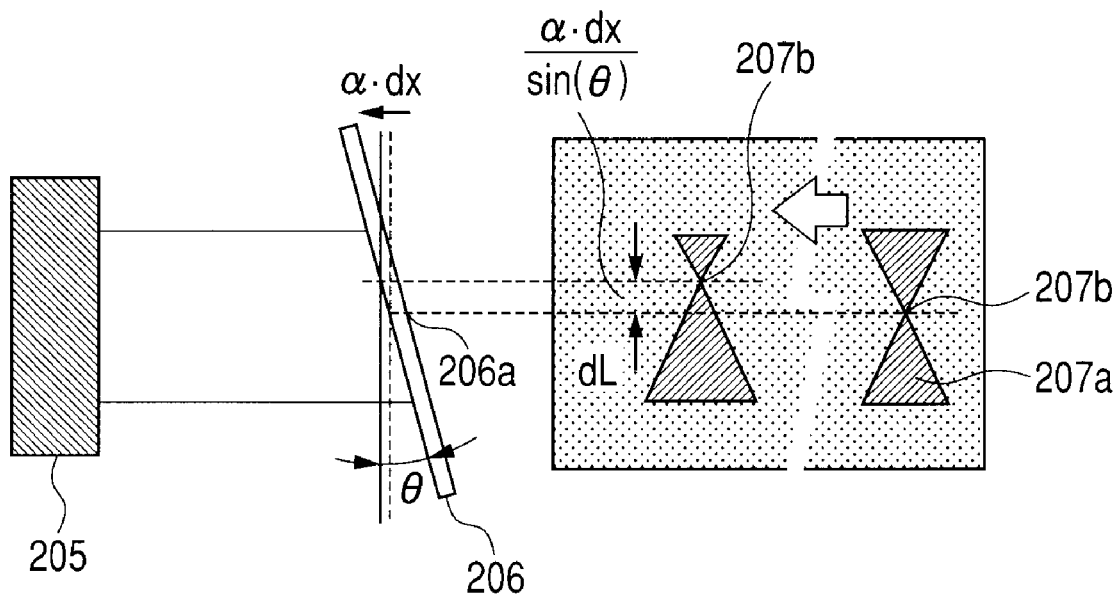
FIG. 2 is an explanation diagram for a part of FIG. 1.
Figure 7:
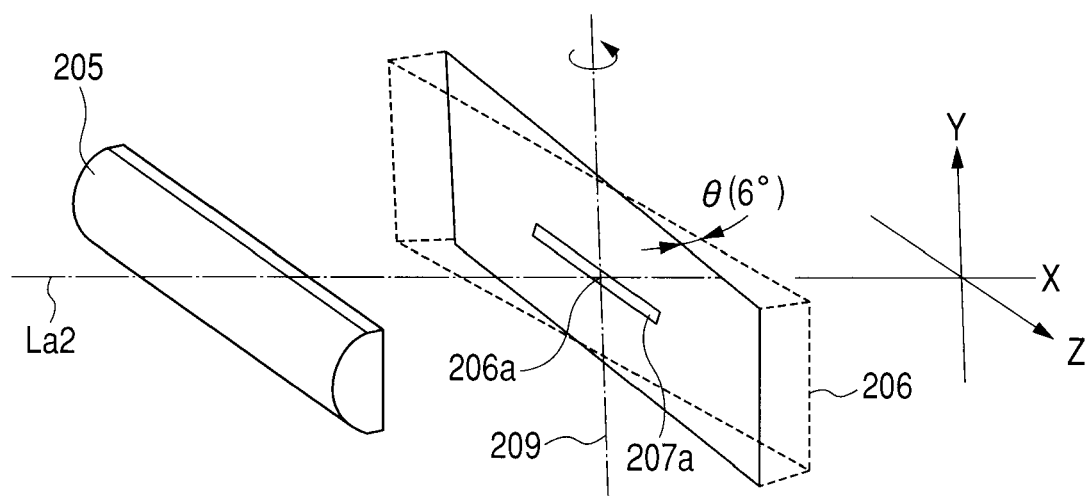
FIG. 7 is an explanation diagram for a part of FIG. 1.

FIGS. 2 and 7 are each an explanation diagram for a part of FIG. 1. The height detection apparatus according to the first embodiment is used for measuring the height of toner attached on an intermediate transferring belt (image bearing member) in an image forming apparatus employing an electrophotographic process, such as a laser beam printer (LBP) or a digital copying machine.

In FIG. 1, the height detection apparatus includes a light source unit 201, a collimator lens 202, and a half mirror 203. The light source unit 201 is formed of a point light source using a semiconductor laser. The collimator lens 202 has an incidence side and an output side thereof formed in a flat shape and in a convex shape, respectively, and makes a light flux emitted from the light source unit 201 a flux of parallel light beams. The half mirror 203 separates the light flux emitted from the collimator lens 202 into reflected light and transmitted light.

The height detection apparatus further includes an imaging lens 204 (first imaging lens) for condensing, on a subject surface 207, the light flux transmitted through the half mirror 203. The imaging lens 204 is plano-convex and is provided on a subject side.

The height detection apparatus further includes an imaging lens 205 (second imaging lens) for condensing, on a two-dimensional optical sensor 206, the light flux obtained by reflecting the light reflected from the subject surface 207 on the half mirror 203. The imaging lens 205, which is provided on a detector side, has an anamorphic power and is plano-convex.

The collimator lens 202 and the imaging lens 204 constitute a part of an illumination optical system. The imaging lenses 204 and 205 constitute a part of an imaging optical system.

In this embodiment, the light flux emitted from the light source unit 201 formed of the semiconductor laser is converted into parallel light beams by the collimator lens 202, passes through the half mirror 203, and then is condensed in a dot shape on the subject surface 207 by the imaging lens 204 provided on the subject side.

The light reflected from the irradiated subject surface 207 passes through the imaging lens 204 provided on the subject side again, and then, is reflected and directed by the half mirror 203 in the direction of an optical axis La2, which is a direction perpendicular to an optical axis La1 of the collimator lens 202 and the imaging lens 204 provided on the subject side.

By passing through the imaging lens 205 provided on the detector side, which has the anamorphic power, the directed light flux forms a focal line (line image) 207a on a plane (Y-Z plane), which is optically in parallel with the subject surface 207.

The two-dimensional optical sensor 206 has a center 206a thereof positioned at an intersection between the optical axis La2 of the imaging lens 205 provided on the detector side and the focal line 207a of the imaging lens 205 provided on the detector side. The surface of the two-dimensional optical sensor 206 is arranged in a manner that is rotated by an angle θ (=6°) about an axis 209, which passes through the optical axis La2 and is perpendicular to the focal line (line image) 207a and the optical axis La2 of the imaging lens 205 provided on the detector side.

It should be noted that each of the imaging lenses 204 and 205 employs a resin that has a refractive index of 1.4971 with respect to a light beam having a wavelength of 790 nm, and is formed by injection molding.

Figure 3A:
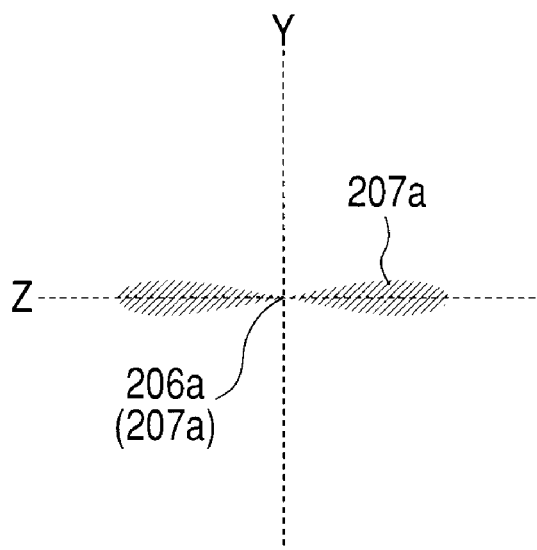
FIGS. 3A and 3B are each an explanation diagram for a focal line on a sensor of FIG. 1.
Figure 3B:
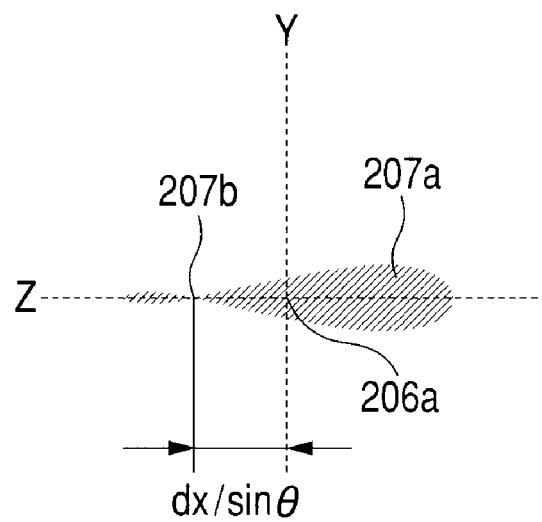

The two-dimensional optical sensor 206 is disposed in a tilted manner with respect to the formed focal line 207a, and hence the focal line 207a is observed, on the optical sensor 206, as being in a ribbon shape as illustrated in FIGS. 3A and 3B. At a further edge portion in a focal line direction, this image becomes more defocused on the optical sensor 206, and also, the intensity per unit area thereof to be observed becomes smaller. Conversely, at a portion where the focal line 207a intersects the surface of the optical sensor 206, the image becomes focused, and accordingly, the intensity thereof to be observed also becomes larger.

In this embodiment, at the two-dimensional optical sensor 206, a position of a pixel at which the largest intensity has been observed, or a position 207b at which the width of the ribbon-shaped image is the narrowest is detected. Then, based on the tilt θ of the surface of the optical sensor 206 with respect to the optical axis La2, the position of the focal line 207a on the optical axis La2 of the imaging lens 205 provided on the detector side is detected.

After that, based on the detected position of the focal line 207a and a magnifying power of the optical systems, the height of the subject surface 207 in the optical axis direction of the imaging lens 204 is obtained through calculation.

Tables 1 and 2 show numerical examples for optical arrangement and the respective lenses according to this embodiment.

In Tables 1 and 2, a curvature radius is denoted by r, and an aspherical surface coefficient is denoted by k. Curvature radiuses in the Z-direction and the Y-direction are denoted by rz and ry, respectively (see FIG. 7). Aspherical surface coefficients in the Z-direction and the Y-direction are denoted by kz and ky, respectively.

TABLE 1

Aspherical surface coefficients of collimator lens 202 and imaging lens 204 provided on subject surface side

|  | r | k |
|---|---|---|
| Convex surface | −4.85954 | −0.57 |
| Flat surface | ∞ | 0 |

Aspherical surface coefficients of imaging lens 205 provided on detector side

|  | rz | ry | kz | ky |
|---|---|---|---|---|
| Convex surface | −4.85954 | ∞ | −0.57 | 0 |
| Flat surface | ∞ | ∞ | 0 | 0 |

TABLE 2

Spacing between surfaces of optical systems according to first embodiment

| Spaces | (mm) |
|---|---|
| From light source to collimator R1 | 7.981 |
| Thickness of collimator lens | 3.000 |
| From collimator R2 to convex surface of first imaging lens | 7.000 |
| Thickness of first imaging lens | 3.000 |
| From flat surface of first imaging lens to subject surface | 7.981 |
| From subject surface to flat surface of first imaging lens | 7.981 |
| Thickness of first imaging lens | 3.000 |
| From convex surface of first imaging lens to convex surface of second imaging lens | 7.000 |
| From flat surface of second imaging lens to center of sensor | 7.981 |

The collimator lens 202 and the imaging lens 204 provided on the subject side according to this embodiment each have a configuration in which the shape of the incidence surface or output surface thereof has such an aspherical surface shape as expressed by Equation 1 described below. Assuming that an intersection between the surface of each lens and the optical axis thereof is the origin, that the optical axis direction of each lens is the X-axis, and that a distance in a direction perpendicular to the optical axis is h, the aspherical surface shape is expressed by the following equation.

(Equation 1)

$$x = \frac{\frac{h^2}{R}}{1 + \sqrt{1 - (1+k)\left(\frac{h}{R}\right)^2}} \qquad \text{Equation 1}$$

Further, the imaging lens 205, which is optically the closest to the two-dimensional optical sensor 206 provided on the detector side, has a power only in the Y-direction which is parallel with the optical axis L1a of the collimator lens 202 and the imaging lens 204 provided on the subject side.

Then, the aspherical surface shape of the imaging lens 205 has an intersection between the lens surface of the imaging lens 205 provided on the detector side and the optical axis La2 set as the origin. Further, the direction of the optical axis La2 of the imaging lens 205 provided on the detector side is set as the X-axis. A direction perpendicular to the optical axis La2 of the imaging lens 205 provided on the detector side within a plane containing the optical axis La1 of the imaging lens 204 provided on the subject side and the optical axis La2 of the imaging lens 205 provided on the detector side is set as the Z-axis.

Under this condition, the aspherical surface shape of the imaging lens 205 is expressed as follows.

(Equation 2)

$$x = \frac{\frac{Z^2}{R}}{1 + \sqrt{1-(1+k)\left(\frac{Z}{R}\right)^2}}$$ Equation 2

In this embodiment, as the light source unit 201, there is employed an infrared laser device that emits a light flux having a wavelength λ of 790 nm. Further, by appropriately designing the surface shape and arrangement of each optical element, spherical aberration is desirably corrected at both positions of the subject surface 207 and the focal line 207a.

Here, in this embodiment, the surface shapes of the collimator lens 202, the imaging lens 204 provided on the subject side, and the imaging lens 205 provided on the detector side are defined by the above-mentioned equations, but the aspherical surface of this embodiment may be defined by other expressions.

In this embodiment, the collimator lens 202 and the imaging lens 204 provided on the subject side are substantially identical to each other, and are used with installation directions thereof reversed to each other.

Further, the imaging lens 205 provided on the detector side has the same power as the collimator lens 202 and the imaging lens 204 provided on the subject side only in a direction parallel with the optical axis La1 of the collimator lens 202 and the imaging lens 204 provided on the subject side. Accordingly, in a plane (X-Y plane) containing the optical axes of those three lenses 202, 204, and 205, there exists relation of substantially equal magnification imaging among the light source unit 201, an image plane of the imaging lens 204 provided on the subject side, and an image plane of the imaging lens 205 provided on the detector side.

Here, first, a case in which the subject surface 207 is positioned at the focal position of the imaging lens 204 provided on the subject side is described below.

In this case, the light flux emitted from the light source unit 201 forms an image as a dot-shaped spot on the subject surface 207 through the collimator lens 202 and the imaging lens 204 provided on the subject side.

Then, the light flux reflected from the subject surface 207 passes through the imaging lens 204 provided on the subject side again, and is then converted into parallel light beams, which are then directed by the half mirror 203 in the direction perpendicular to the optical axis of the collimator lens 202 and the imaging lens 204 provided on the subject side.

The directed light flux enters the imaging lens 205 provided on the detector side, which has the anamorphic power. Then, the light flux forms the focal line (line image) 207a at the focal position of the imaging lens 205 provided on the detector side in the plane (Y-Z plane) perpendicular to the optical axis La2 of the imaging lens 205 provided on the detector side.

In this case, as illustrated in FIG. 3A, the image on the optical sensor 206 exhibits a ribbon-shaped image which is rotationally symmetric about the optical axis La2 of the imaging lens 205 provided on the detector side with the center 206a of the optical sensor 206 having the highest intensity. The focal line 207a has a center 207b.

Next, a case in which the subject surface 207 is displaced by a distance dx in the direction of the optical axis La1 from the focal position of the imaging lens 204 provided on the subject side is described below. In this case, the subject surface 207, which serves as a secondary light source, comes closer to the imaging lens 205 provided on the detector side by the distance dx. Accordingly, the relation of equal magnification imaging is broken, and the position of the focal line also becomes displaced by the distance dx along the optical axis La2 of the imaging lens 205 provided on the detector side.

In this case, as illustrated in FIG. 3B, the image on the optical sensor 206 exhibits a ribbon-shaped image which has the point 207b serving as a knot thereof. The point 207b is displaced by a distance dx/sin 6° in the focal line direction from the center 206a of the optical sensor 206, and has the highest intensity.

By detecting the highest intensity position 207b on the optical sensor 206 or the constricted position 207b of the ribbon-shaped image as described above, a variation in height of the subject surface 207 can be calculated with ease based on the tilt angle θ of the optical sensor 206.

Further, because all the light beams emitted from the light source unit 201 can be used for the detection, the height of the subject surface 207 can be detected with high precision compared to the conventional configuration which employs a pinhole slit.

In addition, unlike the relation between the pinhole and the optical axes of the optical systems, high precision alignment is not required, and hence the height detection apparatus can be assembled with ease.

A longitudinal magnification of the imaging optical system in the plane (X-Y plane) containing the optical axis La2 of the imaging optical system (205) and the axis perpendicular to the focal line 207a is assumed to be α. A rotational angle of the light detection surface of the optical sensor 206 with respect to the plane perpendicular to the optical axis La2 of the imaging optical system is assumed to be θ. In this case, the following condition is satisfied.

$$0.1 \leq \alpha/\sin\theta \leq 10 \qquad (1)$$

With this configuration, height information of a subject having a size of approximately 5 μm, such as toner particles, can be obtained through measurement with an appropriate resolution.

When consideration is given to performance specifications appropriate as a toner height detection apparatus for detecting the height of toner attached on an image bearing member, the pixel pitch of a general one-dimensional or two-dimensional optical sensor is approximately 10 μm, and the length of the long side of the sensor is approximately 3 mm. Accordingly, the resolution in a height direction of the subject surface may be considered to be approximately 5 μm, and a detectable height range may be considered to be approximately ±0.5 mm.

In view of this, a conditional expression (1) is preferably set as follows.

$$1 \leq \alpha/\sin\theta \leq 5 \qquad (1a)$$

Here, if α/sin θ is smaller than 0.1, the constricted position of the ribbon-shaped image does not shift sufficiently enough to meet variations in height of the subject surface formed of toner particles, which results in decrease in detection precision.

Further, if α/sin θ is larger than 10, the constricted position 207b of the image, or the highest intensity position, shifts significantly, while a height range measurable by a general CCD sensor becomes extremely narrow. Thus, the entire device needs to be upsized as well as the CCD sensor.

Second Embodiment

Figure 4:
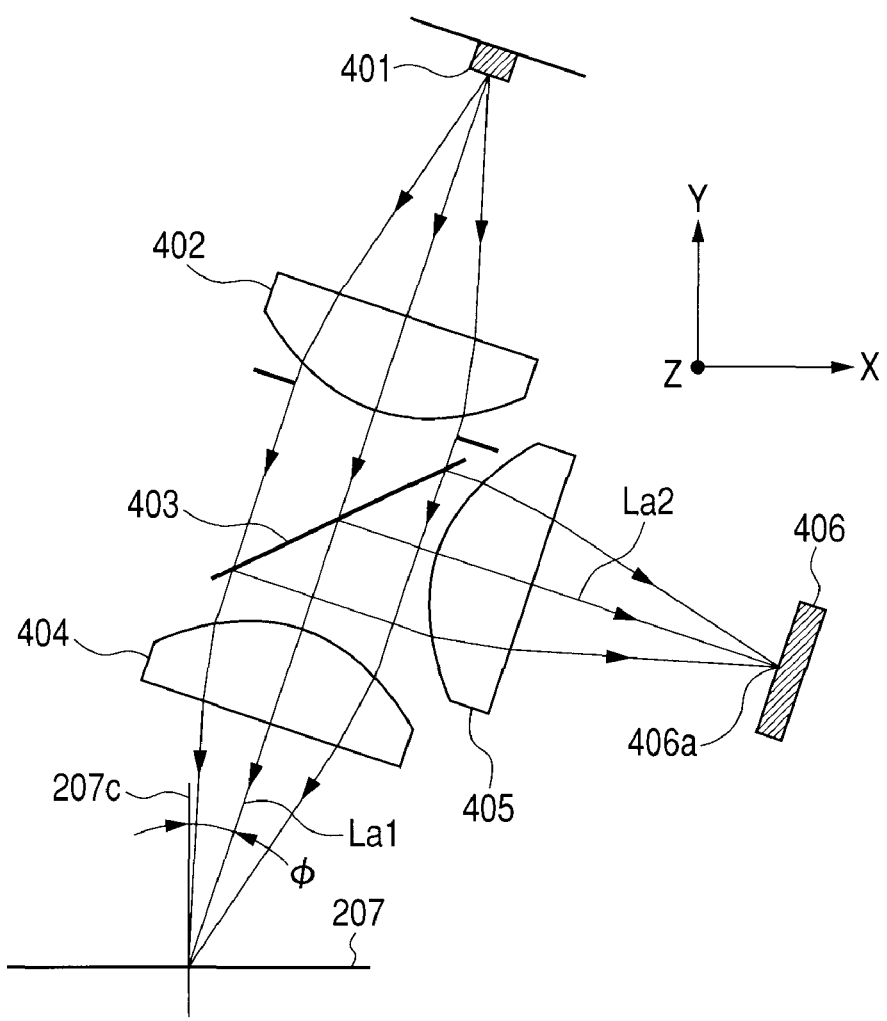
FIG. 4 is a main part schematic diagram of a height detection apparatus according to a second embodiment of the present invention.

FIG. 4 is a diagram for describing a schematic configuration of a height detection apparatus according to a second embodiment of the present invention.

The first embodiment employs a system in which a light flux emitted from the light source unit 201 enters the subject surface 207 perpendicularly. However, in a case where the subject surface 207 is smooth, and more specular reflection components are contained in the reflected light compared to scattered light, there is a fear that detection precision be decreased.

The reason for this is as follows. When the irradiated subject surface is treated as a secondary object point, the shift in height of the subject surface equivalently corresponds to the shift of the secondary object point in a case where the height is detected with the scattered light. However, in a case where the height is detected with the specular reflection light, the shift of the light source image, which serves as the secondary object point, is observed with twice the amount of the shift in height of the subject surface, in the direction of the optical axis.

As a result, the optical detector makes such observation that light beams reflected from multiple heights of the subject surface are apparently entering due to the scatter components and the specular reflection components.

In this embodiment, in an illumination optical system and an imaging optical system, the principal ray of a light flux which is emitted from the illumination optical system and enters the subject surface 207 enters the subject surface 207 with a definite angle. The illumination optical system and the imaging optical system are arranged so that a light flux, which is reflected on the subject surface 207, passes through the imaging optical system, and forms an image at the light detection unit, is formed of other light beams than the specular reflection light emitted from the subject surface.

In this embodiment, an optical axis La1 of the illumination optical system (402, 404) and the imaging optical system (404, 405), which are similar in configuration to those of the first embodiment, is tilted by an angle φ with respect to a normal line 207c of the subject surface 207. Specifically, the tilt angle φ is set to 18°. An incident light flux emitted from a light source unit 401 is caused to enter the subject surface 207 in a slanting direction, thereby preventing the specular reflection components from the subject surface 207 from entering again an imaging lens 404 provided on the subject side.

With this configuration, even when the subject surface 207 is smooth, the specular reflection components contained in the reflected light exert less influence on the detection precision.

Respective members of the height detection apparatus according to the second embodiment are similar to the members of the height detection apparatus according to the first embodiment.

A light flux emitted from the light source unit 401 formed of a semiconductor laser is converted by a collimator lens 402 into parallel light beams, which then pass through a half mirror 403 and are condensed in a dot shape on the subject surface 207 by the imaging lens 404 provided on the subject side.

The light reflected from the irradiated subject surface 207 passes again through the imaging lens 404 provided on the subject side, and then, is reflected and directed by the half mirror 403 in the direction of an optical axis La2, which is a direction perpendicular to the optical axis La1 of the collimator lens 402 and the imaging lens 404 provided on the subject side.

By passing through an imaging lens 405 provided on the detector side, which has the anamorphic power, the directed light flux forms a focal line 207a in parallel with the subject surface 207 on a plane which is optically in parallel with the subject surface 207.

A two-dimensional optical sensor 406 has a center 406a thereof positioned at an intersection between the optical axis La2 of the imaging lens 405 provided on the detector side and the focal line 207a of the imaging lens 405 provided on the detector side. The surface of the optical sensor 406 is arranged as being rotated by 6° about an axis perpendicular to the focal line 207a and the optical axis La2 of the imaging lens 405 provided on the detector side.

It should be noted that each of the imaging lenses 404 and 405 is formed of a resin that has a refractive index of 1.4971 with respect to a light beam having a wavelength of 790 nm, and is formed by injection molding.

Here, in this embodiment, an optical element for guiding a light flux entering the subject surface 207 and the reflected light flux from the subject surface 207 is configured by the imaging lens 404 provided on the subject side, which is formed of a single lens. In such an optical element, the incident light flux and the reflected light flux are coaxial with each other. Apart from this configuration, the present invention is also applicable to a non-coaxial optical system which employs different lenses for forming the optical elements.

Figure 5A:
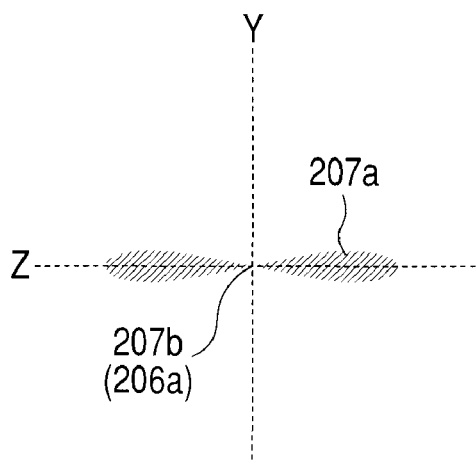
FIGS. 5A and 5B are each an explanation diagram for a focal line on a sensor of FIG. 4.
Figure 5B:
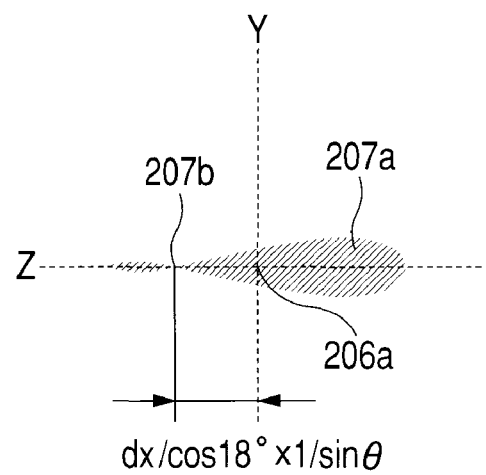
Figure 6:
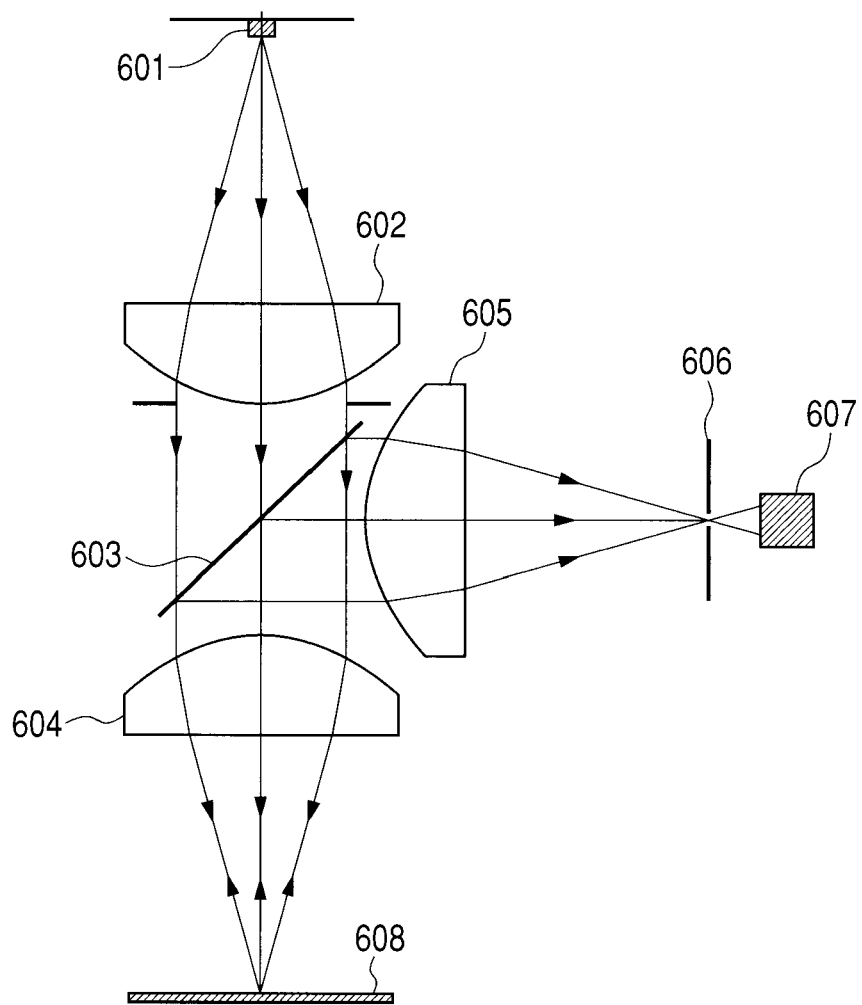
FIG. 6 is a main part schematic diagram of a conventional height detection apparatus.

The two-dimensional optical sensor 406 is disposed in a tilted manner with respect to the formed focal line 207a, and hence the focal line 207a is observed, on the optical sensor 406, as being in a ribbon shape as illustrated in FIGS. 5A and 5B. As becoming closer to the edge portion of the focal line, this image becomes more defocused on the optical sensor 406, and the intensity per unit area thereof to be observed also becomes smaller.

Conversely, at a portion where the focal line 207a intersects the surface of the optical sensor 406, the image becomes focused, and accordingly, the intensity thereof to be observed also becomes larger.

In this embodiment, the imaging lens 405 provided on the detector side is disposed so that the focal line 207a to be formed in the vicinity of the optical sensor 406 is formed in a plane parallel with the subject surface 207. Hence, the ribbon-shaped image described above does not shift in the focal line direction due to irregularity of the subject surface 207.

With this configuration, a position 207b at which the width of the ribbon-shaped image is the narrowest is detected on the two-dimensional optical sensor 406. Then, based on the tilt of the sensor surface, the position of the focal line 207a is detected on the optical axis La2 of the imaging lens 405 provided on the detector side. Further, based on the detected position of the focal line 207a and the magnifying power of the optical systems, the height of the subject surface 207 can be obtained through calculation.

It should be noted that, in this embodiment, the optical sensor 406 is formed of a two-dimensional sensor. However, a one-dimensional sensor may be installed at the focal line position in the focal line direction, and a position having the highest intensity to be monitored may be determined, to thereby calculate the height of the subject surface.

Similarly to the first embodiment, Tables 3 and 4 show numerical examples for optical arrangement and the respective lenses according to this embodiment.

TABLE 3

Aspherical surface coefficients of collimator lens 402 and imaging lens 404 provided on subject surface side

|  | r | k |
|---|---|---|
| Convex surface | −4.85954 | −0.57 |
| Flat surface | ∞ | 0 |

Aspherical surface coefficients of imaging lens 405 provided on detector side

|  | r | k | kz | ky |
|---|---|---|---|---|
| Convex surface | −4.85954 | ∞ | −0.57 | 0 |
| Flat surface | ∞ | ∞ | 0 | 0 |

TABLE 4

Spacing between surfaces of optical systems according to second embodiment

| Spaces | (mm) |
|---|---|
| From light source to collimator R1 | 7.981 |
| Thickness of collimator lens | 3.000 |
| From collimator R2 to convex surface of first imaging lens | 7.000 |
| Thickness of first imaging lens | 3.000 |
| From flat surface of first imaging lens to subject surface | 7.981 |
| From subject surface to flat surface of first imaging lens | 7.981 |
| Thickness of first imaging lens | 3.000 |
| From convex surface of first imaging lens to convex surface of second imaging lens | 7.000 |
| From flat surface of second imaging lens to center of sensor | 7.981 |

It should be noted that the optical axis La1 of the imaging lens 404 is tilted from the normal line 207c of the subject surface 207 by an angle $\phi$ (=18°).

The collimator lens 402 and the imaging lens 404 provided on the subject side according to this embodiment each have a configuration in which the shape of the incidence surface or output surface thereof has such an aspherical surface shape as expressed by Equation 1 and Equation 2 described above.

Further, the imaging lens 405 provided on the detector side is configured with such an aspherical surface shape as expressed by Equation 2 described above.

In this embodiment, as the light source unit 401, there is employed an infrared laser device that emits a light flux having a wavelength $\lambda$ of 790 nm. Further, by appropriately designing the surface shape and arrangement of each optical element, spherical aberration is satisfactorily corrected at both positions of the subject surface 207 and the focal line 207a.

Here, in this embodiment, the surface shapes of the collimator lens 402, the imaging lens 404 provided on the subject side, and the imaging lens 405 provided on the detector side are defined by the above-mentioned equations, but the aspherical surfaces of this embodiment may be defined by other expressions.

In this embodiment, the collimator lens 402 and the imaging lens 404 provided on the subject side are substantially identical to each other, and are used with installation directions thereof reversed to each other.

Further, the imaging lens 405 provided on the detector side has the same power as the collimator lens 402 and the imaging lens 404 provided on the subject side, only in a direction parallel with the optical axis La1 of the collimator lens 402 and the imaging lens 404 provided on the subject side.

Accordingly, in a plane (X-Y plane) containing the optical axes of those three lenses 402, 404, and 405, there exists a relation of substantially equal magnification imaging among the light source unit 401, an image plane of the imaging lens 404 provided on the subject side, and an image plane of the imaging lens 405 provided on the detector side.

Here, first, a case in which the subject surface 207 is positioned at the focal position of the imaging lens 404 provided on the subject side is described below.

In this case, the light flux emitted from the light source unit 401 forms an image as a dot-shaped spot on the subject surface 207 through the collimator lens 402 and the imaging lens 404 provided on the subject side.

Then, a scattered light flux emitted from the subject surface 207 passes through the imaging lens 404 provided on the subject side again, and is then converted into parallel light beams, which are then directed by the half mirror 403 in the direction perpendicular to the optical axis of the collimator lens 402 and the imaging lens 404 provided on the subject side.

By passing through the imaging lens 405 provided on the detector side, which has the anamorphic power, the directed light beams form the focal line 207a at the focal position of the imaging lens 405 provided on the detector side in a plane perpendicular to the optical axis La1 of the collimator lens 402 and the imaging lens 404 provided on the detector side.

In this case, as illustrated in FIG. 5A, the image on the optical sensor 406 exhibits a ribbon-shaped image which is rotationally symmetric about the optical axis La2 of the imaging lens 405 provided on the detector side, with a center 406a of the optical sensor 406 having the highest intensity.

Next, in a case where the subject surface 207 is displaced by a distance dx in the direction of the normal line 207c of the subject surface 207 from the focal position of the imaging lens 404 provided on the subject side, the subject surface 207, which serves as a secondary light source, comes closer to the imaging lens 405 provided on the detector side, by dx/cos 18°. Accordingly, the relation of equal magnification imaging is dissolved, and the position of the focal line 207a also becomes displaced by the distance dx/cos 18° along the optical axis La2 of the imaging lens 405 provided on the detector side.

In this case, as illustrated in FIG. 5B, the image on the optical sensor 406 exhibits a ribbon-shaped image which has, as a knot thereof, a point displaced by a distance dx/cos 18°×1/sin 6° in the focal line direction from the center (206a) of the optical sensor 406.

By detecting a knot position 207b of the ribbon-shaped image on the optical sensor 406 as described above, a variation in height of the subject surface 207 can be calculated with ease based on the tilt angle of the optical sensor 406.

Further, because all the light beams emitted from the light source unit 401 can be used for the detection, the height of the subject surface 207 can be detected with high precision compared to the conventional configuration which employs a pinhole slit. In addition, unlike the relation between the pinhole and the optical axes of the optical systems, high precision alignment is not required, and hence the detection apparatus can be assembled with ease.

Hereinabove, the exemplary embodiments of the present invention have been described. However, the present invention is not limited to those embodiments, and various modifications and changes may be made within the scope thereof.

By employing the height detection apparatus according to each of the embodiments described above, a toner height detection apparatus for measuring the height of toner on an image bearing member with high precision can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-319410, filed Dec. 16, 2008, which is hereby incorporated by reference herein in its entirety.

What is claimed is:

1. A detection apparatus, comprising:
   a light source unit;
   an illumination optical system for illuminating a subject surface with a light flux emitted from the light source unit;
   an imaging optical system for causing the light flux reflected on the subject surface to form an image as a line image on an imaging surface; and
   a light detection unit disposed on the imaging surface, the light detection unit having multiple sensors arranged one-dimensionally or two-dimensionally,
   the detection apparatus detecting the height information of the subject surface in an optical axis direction of the illumination optical system based on light information detected by the light detection unit, wherein:
   the light detection unit has a light detection surface thereof positioned on an optical axis of the imaging optical system; and
   the light detection surface of the light detection unit is positioned in a plane rotated about a rotational axis, the rotational axis being an axis which is perpendicular to an optical axis of an optical element positioned optically closest to the light detection unit among optical elements constituting the imaging optical system, and is perpendicular to the line image to be formed by the imaging optical system.

2. A detection apparatus according to claim 1, wherein:
   the light source unit comprises a point light source; and
   the illumination optical system condenses the light flux emitted from the point light source on the subject surface in a dot shape.

3. A detection apparatus according to claim 1, wherein:
   the imaging optical system comprises an anamorphic optical surface; and
   the detection apparatus satisfies the following condition:

$$0.1 \leq \alpha/\sin\theta \leq 10$$

where $\alpha$ represents a longitudinal magnification of the imaging optical system in a plane containing the optical axis of the imaging optical system and the axis perpendicular to the line image, and $\theta$ represents a rotational angle of the light detection surface of the light detection unit with respect to the plane perpendicular to the optical axis of the imaging optical system.

4. A detection apparatus according to claim 1, wherein the illumination optical system and the imaging optical system are arranged so that a principal ray of the light flux which is emitted from the illumination optical system and enters the subject surface enters the subject surface with a definite angle, and that the light flux which is reflected on the subject surface, passes through the imaging optical system, and forms the image on the light detection unit is formed of other light beams than specular reflection light beams from the subject surface.

5. A detection apparatus according to claim 1, wherein the line image to be formed by the imaging optical system is formed in a plane in parallel with the subject surface.

6. A toner detection apparatus which measures a height of toner attached on an image bearing member by employing the detection apparatus according to claim 1.

* * * * *